July 13, 1954

E. S. SAMPSON 2,683,852

REGULATED POWER SUPPLY

Filed Dec. 30, 1949

2 Sheets-Sheet 1

Inventor:
Ernest S. Sampson,
by Paul A. Frank
His Attorney.

July 13, 1954

E. S. SAMPSON 2,683,852

REGULATED POWER SUPPLY

Filed Dec. 30, 1949

2 Sheets-Sheet 2

Inventor:
Ernest S. Sampson,
by Paul A. Frank
His Attorney.

Patented July 13, 1954

2,683,852

UNITED STATES PATENT OFFICE 2,683,852

REGULATED POWER SUPPLY

Ernest S. Sampson, Schenectady, N. Y., assignor to General Electric Company, a corporation of New York Application December 30, 1949, Serial No. 135,990

7 Claims. (Cl. 321—18)

1

This invention relates to regulated electrical power supplies and in particular to improved regulated power supplies in which the electrical output may be adjusted over a wide range of values.

An object of this invention is to provide improved regulated power supplies having substantially the same percentage regulation over a wide range of electrical output values. Other objects and advantages will appear as the description proceeds.

Figure 2:
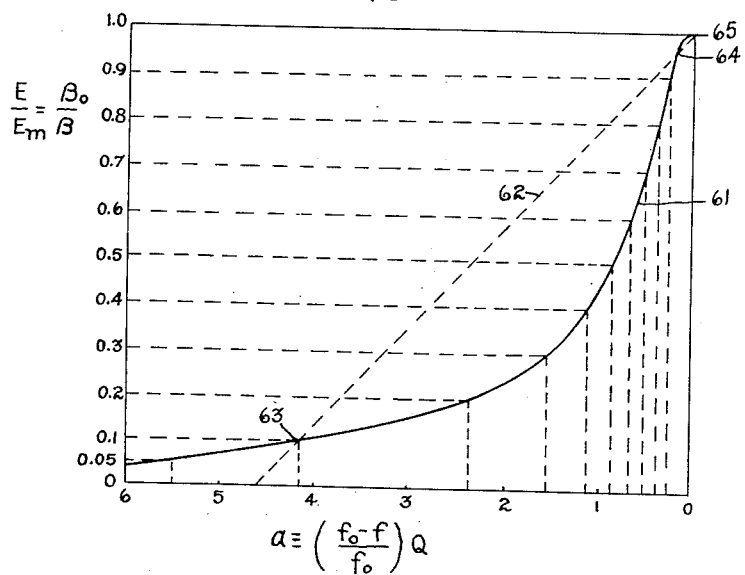
Figure 3:
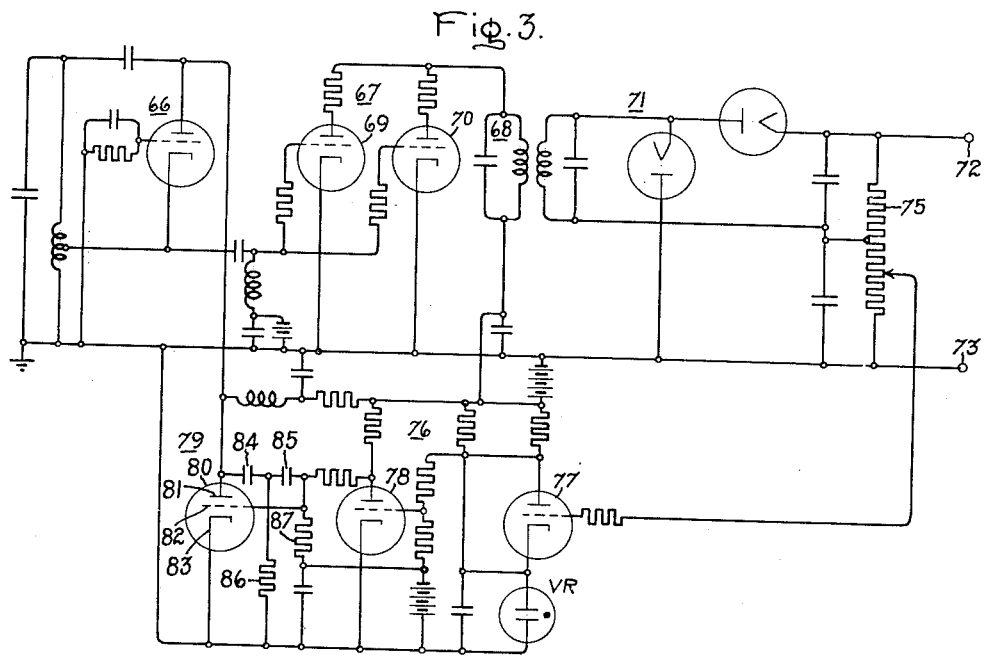
Figure 4:
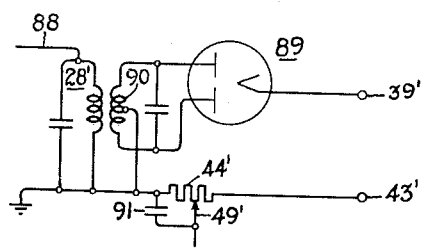

The features of this invention which are believed to be novel and patentable are pointed out in claims which form a part of this specification. For a better understanding of the invention, reference is made in the following description to the accompanying drawings, in which Fig. 1 is a circuit diagram of an improved regulated voltage supply, Fig. 2 is a graph used in explaining the invention, Fig. 3 is a circuit diagram of another improved regulated voltage supply, and Fig. 4 is a partial circuit diagram of a regulated current supply.

Figure 1:
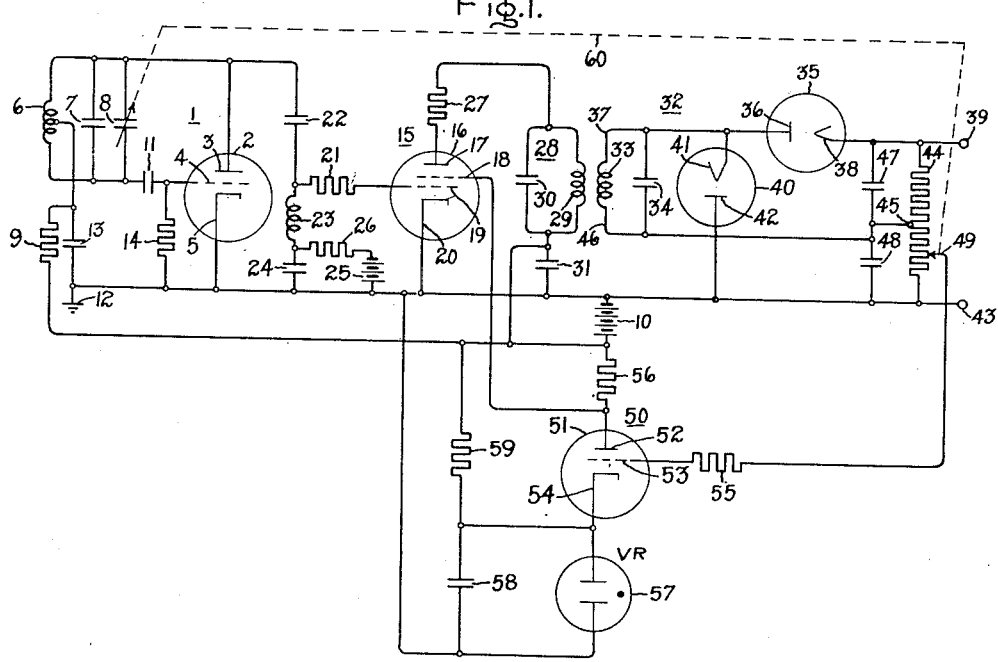

Referring now to Fig. 1, a variable-frequency oscillator 1 may comprise a triode vacuum tube 2 having an anode 3, a control electrode 4, and a cathode 5. A parallel circuit comprising inductor 6 and capacitors 7 and 8 is connected between anode 3 and control electrode 4, as shown. Positive potential is supplied to anode 3 through a center tap on inductor 6, and through resistor 9 from a suitable voltage source, such as battery 10. This potential is kept from the control electrode by capacitor 11. Cathode 5 is connected to ground 12. The tap of inductor 6 is also connected to ground 12 through capacitor 13. Grid leak resistor 14 provides a direct current path from control electrode 4 to ground 12. The oscillator described is a conventional Hartley oscillator, but it will be appreciated that the invention is not limited to this particular type, and that other variable-frequency oscillators can be used with good results.

Connected in cascade with oscillator 1 is a power amplifier 15 which may comprise a tetrode vacuum tube 16 having an anode 17, a screen electrode 18, a control electrode 19, and a cathode 20. Cathode 20 is connected directly to ground 12. Control electrode 19 is connected to anode 3 through resistor 21 and capacitor 22 in series. The circuit junction between resistor 21 and capacitor 22 is connected to ground through inductor 23 and capacitor 24 in series. A source of negative potential, such as battery 25, is connected through resistor 26 to the circuit junction between

2 inductor 23 and capacitor 34. This supplies the proper bias potential to electrode 19. Anode 17 is connected through a resistor 27 to a parallel resonant circuit 28 comprising an inductor 29 and a capacitor 30. The other side of the resonant circuit is connected to ground through capacitor 31, and is connected to the positive side of battery 10 to provide positive direct potential at anode 17. A control potential is applied to screen electrode 18 in a manner hereinafter explained.

When driven by oscillator 1, power amplifier 15 provides alternating current through parallel resonant circuit 28. The design of the power amplifier is substantially conventional, and it will be understood that variations in this circuit are within the scope of this invention. For simplicity in the drawing, only one vacuum tube has been shown in the power amplifier. To provide a larger value of alternating current through resonant circuit 28, it is often desirable that the power amplifier comprise several vacuum tubes connected in parallel in conventional manner.

To provide a direct current output voltage, suitable rectifying means is coupled to resonant circuit 28. For illustration, a voltage-doubler rectifying circuit 32 is shown inductively coupled to circuit 28. Other types of rectifying circuits may be used if desired. Rectifying circuit 32 comprises an inductor 33 in inductively-coupled relation with inductor 29, and a capacitor 34 in parallel with inductor 33 to tune this inductor to substantially the same resonance frequency as circuit 28. A rectifier tube 35 has an anode 36 connected to one end 37 of inductor 33, and has a cathode 38 connected to an output terminal 39. Another rectifier tube 40 has a cathode 41 connected to end 37 of inductor 33, and has an anode 42 connected to an output terminal 43. One of the output terminals, 43 for example, may be connected to ground as shown. Connected between output terminals 39 and 43 is a voltage divider 44 having a center tap 45 connected to end 46 of inductor 33. Capacitors 47 and 48 are connected in parallel with respective halves of voltage divider 44. Voltage divider 44 also has an adjustable tap 49, the purpose and connections of which are hereinafter explained.

A direct current amplifier 50 may comprise a triode vacuum tube 51 having an anode 52, a control electrode 53 and a cathode 54. Control electrode 53 is connected through resistor 55 to tap 49. Anode 52 is connected through resistor 56 to the positive side of battery 10, and cathode 54 is connected through a voltage regulator tube 57 to ground 12. A capacitor 58 is connected in parallel with voltage regulator tube 57, and a resistor 59 is connected in parallel with tube 51 and resistor 56. Anode 52 is connected to screen electrode 18 to control the gain of power amplifier 15 as hereinafter explained. It will be appreciated that variations in the direct current amplifier circuit are within the skill of the art, and that additional stages of amplification may be connected in cascade with the single stage shown to improve the regulation of the power supply.

Operation of the circuit thus far directed is as follows: Oscillator 1 provides alternating potential to the power amplifier control electrode 19, whereupon power amplifier 15 provides alternating current through parallel resonant circuit 28. Electric power is transferred through the inductive coupling between inductors 29 and 33 to the voltage doubler rectifier circuit 32, which provides a direct voltage output between terminals 39 and 43. A control voltage proportional to an adjustable fraction $\beta$ of this electrical output is derived by potential divider 44 between tap 49 and terminal 43. This control voltage establishes the potential at control electrode 53 of amplifier 50. The potential of cathode 54 is maintained constant by voltage regulator tube 57.

If the output voltage between terminals 39 and 43 increases by even a small amount, the potential at control electrode 53 increases by a proportional amount, which causes the potential of anode 52 to decrease. This decreases the potential at screen electrode 18 and thereby decreases the amount of alternating current delivered by power amplifier 15 to resonant circuit 28. This reduces the electrical power transferred to rectifying circuit 32, and thereby reduces the output voltage between terminals 39 and 43. Thus, a control action is achieved which regulates the value of the output voltage. Since operation of the control system is such that it tends to maintain the potential of tap 49 at a substantially constant value, the value of the output voltage can be adjusted by adjusting the position of tap 49 to change the fractional relationship $\beta$ between the control voltage and the output voltage.

As thus far described, the power supply has a serious disadvantage in that the percentage regulation obtained varies with changes in the value of $\beta$. For example, assume that the circuit is designed to have a desired percentage regulation at a particular value of output voltage. If a different output voltage is desired, this can be obtained by changing the value of $\beta$ by adjusting the position of tap 49. However, this also changes the percentage regulation of the power supply, so that satisfactory operation can generally be obtained over only a relatively small range of output voltage values. Satisfactory operation over a wide range of output voltage values, at substantially constant regulation, may be obtained in the following manner:

It can be shown by mathematical circuit analysis that the percentage regulation of the power supply depends upon the product of $\beta$ and $\mu$, where $\mu$ is the loop gain of the control circuit; that is, the amount of change in output voltage which the control circuit tends to produce responsive to a unit change in the control voltage. For constant percentage regulation, the product $\mu\beta$ must be constant; therefore, when $\beta$ is changed, $\mu$ should be changed in substantially inverse proportion.

A convenient way to change $\mu$ is to change the parallel impedance of resonant circuit 28, since the gain of power amplifier 15 is proportional to the value of this impedance. It is well-known that a parallel resonant circuit presents a wide range of impedance values to different frequencies near its resonance frequency. Thus, it is possible to greatly change the effective impedance of circuit 28 by slightly changing the frequency of the alternating current provided through it. For example, when it is desired to decrease the impedance of circuit 28, the frequency of oscillator 1 is changed slightly in a direction away from the resonance frequency of circuit 28. Conversely, when it is desired to increase the impedance of circuit 28, this may be accomplished by tuning oscillator 1 to a frequency closer to the resonance frequency of circuit 28.

Capacitor 8 may be a variable tuning capacitor which adjusts the frequency of oscillator 1. In a preferred embodiment of this invention, capacitor 8 and adjustable tap 49 are ganged as indicated by broken line 60, so that when the value of $\beta$ is changed by adjustment of tap 49, the frequency of oscillator 1 is automatically adjusted to change the effective impedance of resonant circuit 28 to maintain the product of $\mu$ and $\beta$ substantially constant. In this manner, satisfactory regulation may be obtained over a range of output voltage values of 40 to 1 or more.

Referring now to Fig. 2, curve 61 represents the ideal relation between oscillator frequency and output voltage. The vertical scale represents values of $$\frac{E}{E_m}$$

or $$\frac{\beta_0}{\beta}$$

where $E$ and $\beta$ respectively represent the desired value of output voltage and the corresponding $\beta$ value, while $E_m$ and $\beta_0$ respectively represent the maximum output voltage and the corresponding minimum value of $\beta$. The horizontal scale represents values of the perameter $a$, which is defined as $$\frac{f_0 - f}{f_0} Q$$

where $f$ is the desired frequency, $f_0$ is the resonance frequency of circuit 28, and $Q$ is the ratio of inductive reactance to resistance of inductor 29. With the aid of curve 61, the ideal relationship between oscillator frequency and values of $\beta$ can be determined for any given case. The tuning of oscillator 1 can be made to substantially follow this ideal relationship by means of properly shaped cams in the mechanical ganging arrangement, by properly shaping the plates of variable capacitor 8, by proper design of the resistance characteristics of voltage divider 44, or by a combination of these means.

In a practical case however, it is not necessary that the ideal relationship just described be accurately maintained. The difficulty with prior art regulators of a similar type is that the $\mu\beta$ product, and hence the percentage regulation, varies by a factor substantially as large as the range of output voltages covered. A great improvement is obtained even when the proper $\mu\beta$ relationship is maintained only to a very rough approximation. As an example, for simplicity in manufacture capacitor 8 and tap 49 may be ganged together to provide a linear relation between frequency and $\beta$. Such a relation is illustrated by curve 62, Fig. 2. It can be noted that this arrangement provides the ideal relationship at only three points 63, 64, and 65; yet, the improvement over prior art regulators, in which the oscillator frequency remains constant, is substantial over the entire operating range.

Referring now to Fig. 3, which is a circuit diagram of another improved regulated power supply, 66 is a conventional Hartley oscillator, in cascade to which is connected a power amplifier 67, which provides alternating current through a parallel resonant circuit 68. As illustrated, amplifier 67 comprises two vacuum tubes 69 and 70 connected in parallel to provide larger alternating currents through resonant circuit 68. Any number of tubes may be used, as desired. Inductively coupled to circuit 68 is a voltage doubler rectifying circuit 71 which provides a direct voltage output between output terminals 72 and 73. A control voltage, proportional to an adjustable fraction of the output voltage, is provided between an adjustable tap 74 of a voltage divider 75 and terminal 73.

Variations in value of the control voltage are amplified by a two-stage direct current amplifier 76 comprising vacuum tubes 77 and 78. Additional stages of amplification may be added, if desired, to regulate the output voltage within closer limits.

The frequency of oscillator 66 is controlled by a reactance tube circuit 79 which may comprise a triode vacuum tube 80 having an anode 81, a control electrode 82, and a cathode 83. Anode 81 is connected to the anode of oscillator 66, and cathode 83 is connected to ground. Control electrode 82 is connected to the output of amplifier 76, so that the amplified control voltage determines the direct potential of electrode 82, and hence controls the amount of current conducted by tube 80. Alternating potential is applied to electrode 82 from anode 81 through a phase-shifting network comprising capacitors 84 and 85 and resistors 86 and 87. This network provides a 90° phase-shift, so that the current conducted by tube 80 is in phase quadrature with the voltage between anode 81 and cathode 83. Therefore, as is well-known, tube 80 acts as a reactance in the circuit, the value of which depends upon the direct potential of electrode 82. With this arrangement, the control voltage automatically controls the frequency of oscillator 66.

In the operation of this power supply, if the output voltage between terminals 72 and 73 increases, the control voltage between tap 74 and terminal 73 increases proportionately. This increase in the control potential is amplified by amplifier 76, which thereby increases the potential of the reactance tube control electrode 82. Tube 80 then conducts more current, so that its effective reactance is increased. This changes the frequency of oscillator 66 away from the resonance frequency of circuit 68, thereby reducing the effective impedance of circuit 68. This, in turn, reduces the gain of power amplifier 67, so that less power is transferred to rectifying circuit 71 and the output voltage between terminals 72 and 73 is decreased. When the position of tap 74 is changed, the value of the control voltage changes sufficiently to establish the proper frequency of oscillator 66 to provide the correct value of output voltage between terminals 72 and 73.

In the Fig. 3 circuit, the loop gain $\mu$ is not dependent upon the impedance of the parallel resonant circuit 68 in the same manner as in the Fig. 1 arrangement, but the loop gain in the Fig. 3 circuit does depend upon the slope of the resonance curve of circuit 68. It can be observed from curve 61, Fig. 2, which has the same shape as a resonance curve, that the slope of the resonance curve is small for low impedance values and large for high impedance values, so that the two relations give roughly equivalent results.

The improved regulated power supply can be modified to provide a regulated value of current instead of a regulated value of voltage, by connecting the potential divider in series with the output terminals instead of between the two terminals. Such a modification is shown in Fig. 4. In Fig. 4, parallel resonant circuit 28' corresponds to circuit 28 in Fig. 1. An alternating current is provided through this circuit by connection 88 to a power amplifier, not shown. A conventional full-wave rectifying circuit 89 is inductively coupled to circuit 28' through an inductor 90, and is connected to provide direct current to output terminals 39' and 43'. Potential divider 44', having an adjustable tap 49', is connected in series with terminal 43', as shown. The control voltage appears between tap 49' and ground. A by-pass capacitor 91 is provided to eliminate alternating current components from the control voltage. Tap 49' is connected to the direct current amplifier input of the control circuit, not shown. Since the voltage drop across voltage divider 44' may be relatively small, additional stages of amplification may be provided in the direct current amplifier. Portions of the circuit not shown may be similar to corresponding portions of the Fig. 1 circuit or the Fig. 3 circuit.

Having described the principle of this invention and the best mode in which I have contemplated applying that principle, I wish it to be understood that the apparatus described is illustrative only, and that other means can be employed without departing from the true scope of the invention.

What I claim as new and desire to secure by Letters Patent of the United States is:

1. In a regulated power supply of the type having a parallel resonant circuit, means for providing alternating current through said resonant circuit, means coupled to said resonant circuit for providing an electrical output, adjustable means to derive a control voltage proportional to an adjustable fraction $\beta$ of such electrical output, and control means responsive to variations in the value of such control voltage for automatically controlling such alternating current to maintain such electrical output at a predetermined value, the improvement which comprises means operatively coupled to said adjustable control voltage deriving means for automatically changing the effective impedance of said resonant circuit inversely in proportion to changes in the value of the fraction $\beta$.

2. A regulated direct current power supply comprising a parallel resonant circuit, means including a variable-frequency oscillator to provide alternating current through said resonant circuit, rectifying means coupled to said resonant circuit for providing a direct current output voltage, means to derive a control voltage proportional to an adjustable fraction $\beta$ of such direct current output voltage, control means responsive to variations in the value of such control voltage from a standard value for automatically controlling such alternating current to maintain such direct current output voltage constant in value, the loop gain $\mu$ of the control means being related to the parallel impedance of said resonant circuit, and means for automatically changing the frequency of said oscillator when the fraction $\beta$ is changed, thus changing the parallel impedance of said resonant circuit to maintain the product of $\beta$ and $\mu$ substantially constant.

3. A regulated power supply comprising a parallel resonant circuit, means including a variable-frequency oscillator and a power amplifier connected in cascade to provide alternating current through said resonant circuit, rectifying means coupled to said resonant circuit for providing a direct current output voltage, means including a voltage divider having an adjustable tap to derive a control voltage proportional to an adjustable fraction of such direct current output voltage, the value of such fraction depending upon the position of the adjustable tap on said voltage divider, control means responsive to variations in the value of such control voltage from a standard value for automatically adjusting the gain of said amplifier to maintain such output voltage constant in value, and means for changing the frequency of said oscillator when the position of the tap on said voltage divider is changed.

4. A regulated direct current power supply comprising a parallel resonant circuit, means including a variable-frequency oscillator and a variable-gain power amplifier connected in cascade to provide alternating current through said resonant circuit, rectifying means inductively coupled to said resonant circuit and having output terminals between which a direct current output voltage is provided, a voltage divider connected between said output terminals, said voltage divider having an adjustable tap, a direct current amplifier having an input circuit connection to said adjustable tap and having an output circuit connected to control the gain of said power amplifier, and means for changing the frequency of said oscillator when the position of said adjustable tap is changed.

5. A regulated power supply comprising a parallel resonant circuit, means including a variable-frequency oscillator for providing alternating current through said resonant circuit, means coupled to said resonant circuit for providing an electrical output, means to derive a control voltage proportional to such electrical output, and means responsive to variations in the value of such control voltage for automatically controlling the frequency of said oscillator to maintain such electrical output at a predetermined value.

6. A regulated direct current power supply comprising a parallel resonant circuit, means including a variable-frequency oscillator for providing alternating current through said resonant circuit, rectifying means inductively coupled to said resonant circuit and having output terminals between which a direct current output voltage is provided, a voltage divider connected between said output terminals, said voltage divider having an adjustable tap, reactance tube means for controlling the frequency of said oscillator, and a direct current amplifier having an input connection to said adjustable tap and having an output connection to said reactance tube means.

7. In a regulated power supply circuit including in combination oscillatory circuit means for converting low value direct current electric energy into alternating current electric energy having a predetermined amplitude, rectifying means operatively coupled to said oscillatory circuit means for converting the alternating electric energy to high value direct current electric energy, and control signal feedback means operatively coupled between the output of said rectifying means and said oscillatory circuit means to feed back a predetermined portion of the high value direct current electric energy for controlling the operation of the power supply circuit in a manner such that the high value direct current electric energy is maintained essentially constant, the improvement of additional control means comprising a part of said oscillatory circuit means and operatively intercoupled with said control signal feed-back means for varying the gain of said oscillatory circuit means inversely with adjustments in the value of the predetermined portion of the high value direct current electric energy fed back for control purposes.

References Cited in the file of this patent

UNITED STATES PATENTS

| Number | Name | Date |
| --- | --- | --- |
| 2,000,189 | Power | May 7, 1935 |
| 2,085,061 | Aggers | June 29, 1937 |
| 2,177,556 | Walker | Oct. 24, 1939 |
| 2,386,548 | Fogel | Oct. 9, 1945 |
| 2,399,185 | Hedding | Apr. 30, 1946 |
| 2,424,972 | Dubin | Aug. 5, 1947 |
| 2,485,652 | Parker | Oct. 25, 1949 |